July 23, 1935. C. H. CONGDON Re. 19,651

AIRPLANE

Original Filed Nov. 15, 1923

Inventor

C. H. CONGDON

By

Attorney

UNITED STATES PATENT OFFICE 19,651

AIRPLANE

Clem H. Congdon, United States Navy

Original No. 1,830,931, dated November 10, 1931, Serial No. 674,995, November 15, 1923. Application for reissue November 1, 1933, Serial No. 696,229

16 Claims. (Cl. 244—12)

(Granted under the act of March 3, 1883, as amended April 30, 1928; 370 O. G. 757)

This invention relates to improvements in airplanes and more particularly to the construction of airplane wings whereby the lateral control of airplanes at low speeds and high angles of attack may be increased.

One of the objects of the present invention is to provide a simple and practical mechanism of the above general character which may be inexpensively manufactured, assembled and installed.

A further object is to provide a flap mechanism for airplane wings adapted to spoil the lift and increase the drag on the up aileron side of the machine and thereby increase the lateral control of the machine at low speeds and high angles of attack.

Other objects will be in part obvious and in part hereinafter pointed out in connection with the accompanying sheet of drawing.

Figure 1:
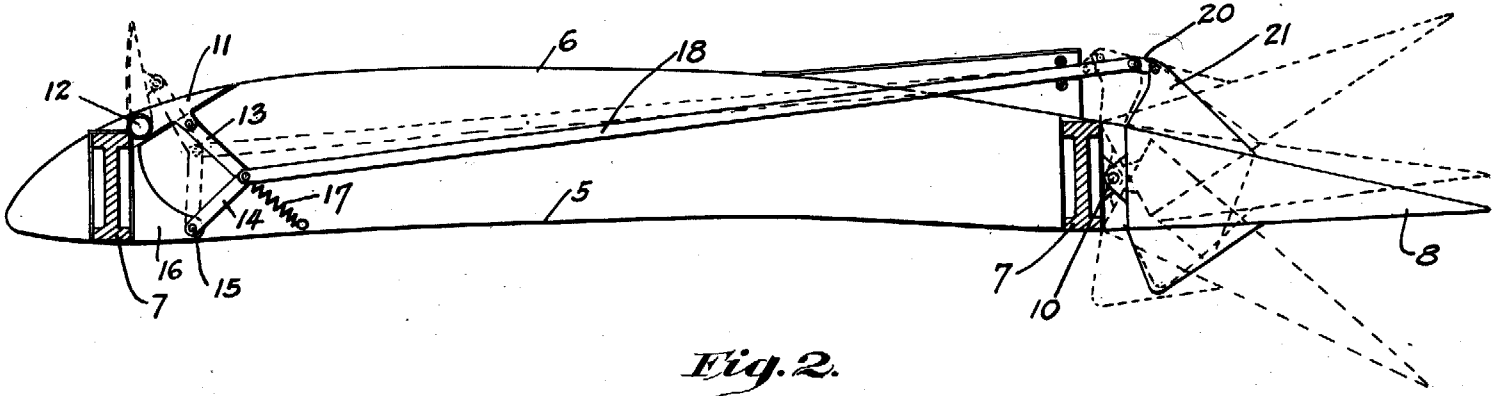
Figure 1 is a transverse, partial, sectional and diagrammatic view showing the invention as applied to an airplane wing in full line position and in dotted line position when operated.
Figure 2:
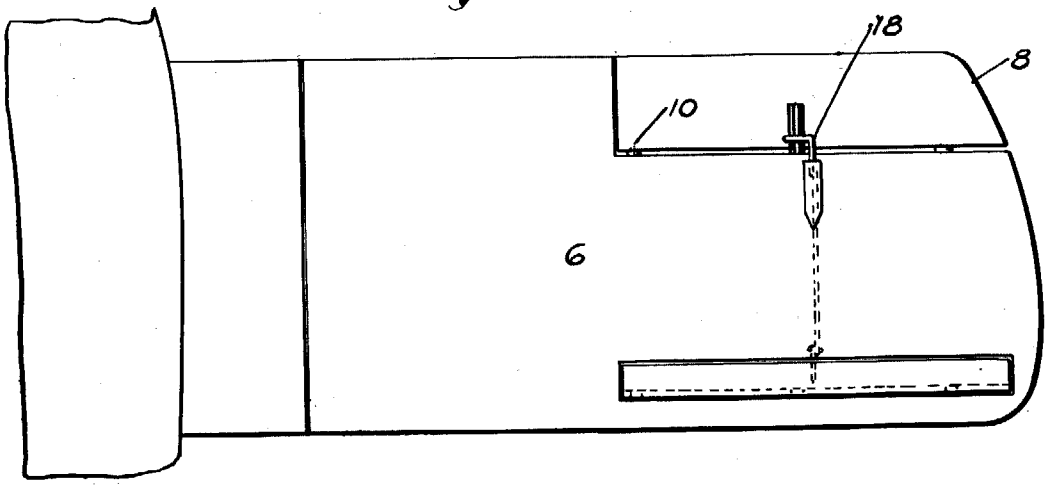
Figure 2 is a plan view of a portion of the wing.

Referring now to the drawing in detail, 5 denotes the lower surface of an airplane wing of standard construction and 6 the upper surface extending between two beams 7 positioned longitudinally of the wing and at the rear there is provided the usual hinged aileron 8 hinged to the rear beam 7 at the point 10 whereby it may be swung upwardly or downwardly as indicated by the dotted line position. Along the forward edge of the wing is mounted the nose flap 11 normally occupying a position in a longitudinal recess whereby its upper surface is flush with and conforms to the upper surface of the wing. This flap is hinged at the point 12 and is provided with a pivotally connected link 13, one end of which is connected with a second pivot link 14 secured by a pivot 15 to a suitable bracket 16, the links 13 and 14 together forming a toggle normally held in restricted position by means of spring 17.

Extending rearwardly of the machine is a link 18, the rear end of which is pivoted at 20 to an aileron horn 21 in such a manner that as the toggle 13—14 is moved to extended position the nose flap 11 will be moved upwardly as shown by its dotted line position and simultaneously the aileron will also be moved. There is, however, a certain amount of lost motion and definite ratio of movement whereby the aileron may be moved a certain extent without moving the nose flap. Upon the wing, and extending beyond the contour thereof, is a relatively narrow tapering hood through which the rod 18 extends into the interior of the wing. Perhaps this can be better explained by a brief statement of the operation which is as follows.

As above stated the operating mechanism for the nose flap 11 acts, in the specific instance shown, against the resistance of spring 17 connected to the toggle links and push rod 18 which extends rearwardly to the aileron horn. The relation between the horn and the push rod or link 18 is such that when the aileron is 5° above normal, or the first dotted line position shown in Figure 1, the horn will come in contact with the push rod and any further movement of the aileron towards the 30° or upper dotted line position will force the nose flap up proportionately. Ratio of the linkage is such that movement of the aileron, by any of the well known operative connections therefor, from the 5° position to the 30° position downwardly from the full line position shown in Fig. 1, will produce substantially no movement of the nose flap, therefore, it will be seen that the nose flap only comes into operation when the aileron moves upwardly above the 5° position and does not function when the aileron moves downwardly and consequently the contour of the wing will not be broken and there will be no disturbance of the air flow thereover. In other words, the flap mechanism is designed to spoil the lift and increase the drag on the up aileron side of the machine and consequently increase the lateral control of the machine at slow speeds and high angles of attack.

It will thus be seen that the present invention provides a reliable and efficient mechanism adapted to accomplish, among others, all of the objects and advantages herein set forth.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and, therefore, such adaptations should and are intended to be comprehended within the meaning and range of equivalence of the following claims.

The invention herein described may be manufactured and used by or for the Government of the United States of America for governmental purposes without the payment of any royalties thereon or therefor.

What I claim is:

1. In an airplane wing construction, in combination, a flap on the upper surface of the wing and slightly to the rear of the forward edge thereof, a trailing aileron adapted to operate in conjunction therewith and means including toggle jointed levers and a rod connecting said flap and aileron for raising them successively, adapted to increase the drag and decrease the lift on one side of the machine at low speed and large angles of attack on the main wing.

2. In an airplane wing construction, in combination, a flap on the upper surface of the wing and slightly to the rear of the forward edge thereof, a trailing aileron adapted to operate in conjunction therewith and means connecting said flap and aileron for operating them successively consisting of toggle jointed levers pivotally connected to said flap and a portion of the wing and a rod pivotally connected to said levers and to said aileron and adapted to increase the drag and decrease the lift on one side of the machine at low speed and high angles of attack on the main wing when the aileron is raised beyond a predetermined point.

3. In an airplane wing construction, in combination, a movable flap adapted normally to occupy a recess extending adjacent the forward edge of the wing, a trailing aileron rearwardly of said flap, connections between said flap and aileron involving a lost motion connection whereby said aileron can be lowered without affecting the nose flap but will operate to raise the nose flap when said trailing aileron is raised a predetermined amount.

4. In an airplane wing construction, in combination, a nose flap extending adjacent a portion of the forward edge of the wing and normally occupying a recess therein, means for holding said flap in retractive position, a trailing aileron rearwardly of said flap adapted to have a relative up and down movement from normal position and a lost motion connection between said aileron and nose flap whereby the nose flap is raised when said trailing aileron is raised a predetermined amount.

5. In an airplane wing construction, in combination, a movable flap extending adjacent the forward edge of the wing, a trailing aileron rearwardly of said flap, connections between said flap and aileron involving a lost motion connection whereby said aileron can be lowered without affecting the nose flap but will operate to raise the nose flap when said trailing aileron is raised a predetermined amount above neutral.

6. In an airplane wing construction, in combination, a nose flap extending adjacent a portion of the forward edge of the wing, means for holding said flap in retractive position, a trailing aileron rearwardly of said flap adapted to have a relative up and down movement from normal position, and a lost motion connection between said aileron and nose flap whereby the nose flap is raised when said trailing aileron is raised a predetermined amount above neutral.

7. In an airplane wing construction, in combination, a beam extending across the forward portion of and within the contour of the wing, a flap hinged to the beam and extending adjacent the forward edge of the wing, a movable trailing aileron mounted on the wing rearwardly of said flap; and means connecting and successively operating said flap and aileron, whereby movement of the aileron may impart movement to the flap.

8. In an airplane construction, in combination, a beam extending across each of the forward and rearward portions and within the contour of the wing, rigid brackets secured to the beam within the contour of the wing, a flap hinged to said brackets and adapted to be moved to change the flow of air over the contour of the wing, a trailing aileron pivotally connected to the rear beam, and means connecting and successively operating said flap and aileron whereby movement of the aileron may impart movement to the flap.

9. The combination of claim 7 characterized by rigid brackets secured to the beam and supporting a portion of the connecting means and to which brackets said flap is hinged.

10. The combination of claim 8 characterized by at least one of said brackets having a rigid portion supporting a portion of the connecting means.

11. The combination of claim 1 characterized by a beam extending across the front portion and within the contour of the wing and supporting said flap, and a rigid bracket secured to said beam and to which bracket one of the toggle jointed levers is pivoted.

12. The combination of claim 7 characterized by a horn attached to the aileron and to which the means is pivotally connected and limited to movement in a single plane, and a narrow tapering hood on the surface and extending beyond the contour of the wing and open only at its mouth into which hood the means extends with only working clearance into the interior of the wing, said hood at its front end being tapered in width and thickness to substantially a point upon the wing contour and contributes to the avoidance of an accumulation of relatively dead air upon the rearward contour of the wing.

13. The combination of claim 5 characterized by an element of said connections being limited by associated means to movement in a single plane and by a hood on the surface and extending beyond the contour of the wing and open only at its mouth into which hood said element of said connections extends into the interior of the wing, said hood being narrow and tapering in width and thickness to substantially a point on the wing contour and contributes to the avoidance of an accumulation of relatively dead air upon the rearward contour of the wing.

14. An airplane wing having an airfoil contour and a hollow interior portion adapted to receive an operating element having means for limiting its operation to movement in a single plane, and a relatively narrow hood on a surface and extending beyond the contour of the wing and open only at its mouth toward the rear edge of the wing and through which mouth the element is adapted to extend with only working clearance into the interior of the wing, the front end of said hood being tapered in width and thickness to substantially a point upon the wing contour and contributes to the avoidance of an accumulation of relatively dead air upon the rearward contour of the wing.

15. In an airplane wing construction, in combination, an airplane wing supporting a movable portion normally contributing to the contour of the wing and adapted to be moved to change the flow of air over the contour of the wing, an aileron movably connected to the wing, means for holding the movable portion in normal position, and means connecting and successively operating said movable portion and aileron whereby movement of one may impart movement to the other.

16. In an airplane, the combination of a wing, a nose flap movably mounted on the upper surface and near the forward edge of one side of the wing, said flap normally being adapted not to decrease the lift on its side of the wing, an aileron movably mounted on and trailing from the rear edge of one side of the wing, said aileron normally being adapted not to substantially increase the drag on its side of the wing, and means for moving successively from their normal positions first the aileron and then the flap for increasing the drag and decreasing the lift on one side of the machine at low speed and large angles of attack on the wing.

CLEM H. CONGDON.